United States Patent [19]

Giese et al.

[11] Patent Number: 4,522,289
[45] Date of Patent: Jun. 11, 1985

[54] RETAINER RING FOR A FREEWHEEL CLUTCH

[75] Inventors: Emil Giese; Ruprecht Maurer, both of Bad Homburg; Max Hagen, Frankfurt am Main, all of Fed. Rep. of Germany

[73] Assignee: Ringspann Albrecht Maurer K.G., Bad Homburg, Fed. Rep. of Germany

[21] Appl. No.: 452,043

[22] Filed: Dec. 22, 1982

[30] Foreign Application Priority Data

Dec. 29, 1981 [DE] Fed. Rep. of Germany ....... 3151727

[51] Int. Cl.$^3$ .............................................. F16D 41/07
[52] U.S. Cl. .................................. 192/41 A; 192/45.1
[58] Field of Search ............................ 192/41 A, 45.1; 188/82.8

[56] References Cited

U.S. PATENT DOCUMENTS

| 3,049,206 | 8/1962 | Zlotek | 192/45.1 |
| 3,443,672 | 5/1969 | Giese | 192/45.1 |
| 3,543,894 | 12/1970 | Giese | 192/45.1 |
| 3,702,649 | 11/1972 | Giese et al. | 192/41 A |
| 3,952,849 | 4/1976 | Brownhill et al. | 192/41 A |
| 4,327,822 | 5/1982 | Vogele et al. | 192/45.1 |

FOREIGN PATENT DOCUMENTS 1915567 10/1972 Fed. Rep. of Germany .

OTHER PUBLICATIONS

"Katalog 81 Freilauf-Einbauelemente", p. 24, FIG. 47.

Primary Examiner—Rodney H. Bonck
Attorney, Agent, or Firm—Spencer & Frank

[57] ABSTRACT

A retainer ring for a freewheel clutch comprises an annular disc and a plurality of sprag-guiding clips mounted on a radial face of the annular disc in a circumferential distribution about the disc axis. Each clip extends parallel to the disc axis and holds a sprag captive. Each clip has two parallel, circumferentially spaced legs extending from the radial disc face and being parallel to the disc axis. The legs extend along opposite sides of the circumferential surface of the sprag. Each clip further has a web interconnecting the clip legs at ends thereof remote from the radial face of the annular disc. The web extends along one of the end faces of the respective sprag.

11 Claims, 12 Drawing Figures

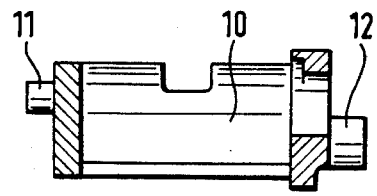
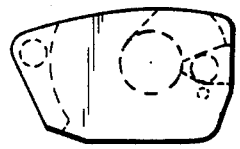
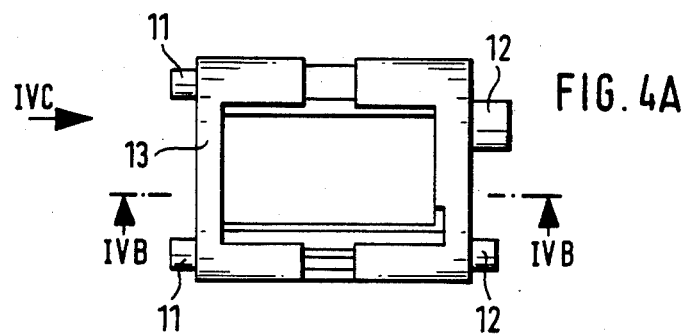
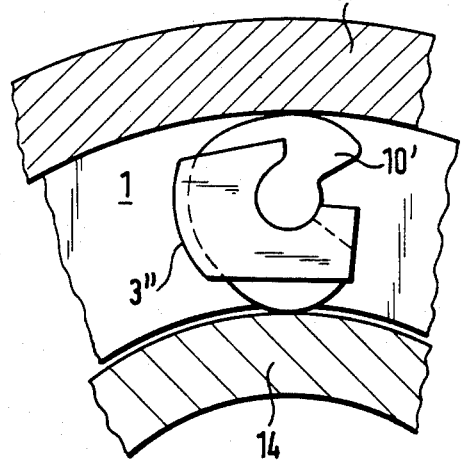
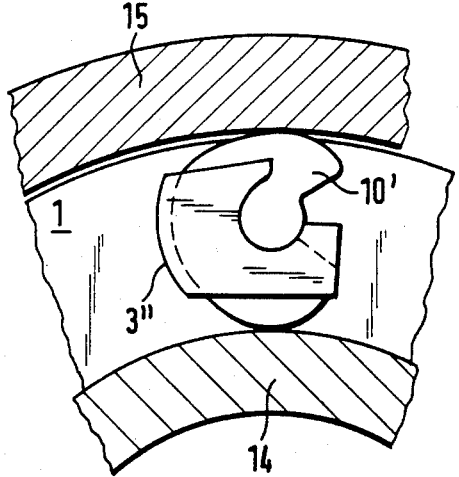

RETAINER RING FOR A FREEWHEEL CLUTCH

BACKGROUND OF THE INVENTION

This invention relates to a retainer ring which is a component of a freewheel clutch and which has generally two substantially radially extending annular discs connected to one another by means of circumferentially adjacent, axially parallel links for accommodating clamping elements (sprags) having flat end faces. The sprags are held captive in the retainer ring by virtue of the particular shape of the links.

One-part or multipart retainer rings of the above-outlined type are known in various configurations such as disclosed, for example, in U.S. Pat. Nos. 3,443,672 and 3,702,649 or German Pat. No. 1,915,567. In these arrangements preponderantly sprags of flat end faces are used. This represents significant manufacturing economy because the sprags may be directly severed from a drawn steel wire of predetermined cross-sectional configuration and there is no need to provide laterally extending bearing stubs which involves expensive manufacturing steps.

On the other hand, it is a disadvantage of the known retainer rings that for each ring dimension a separate die casting tool is needed which represents a very significant expense.

Retainer rings for freewheel clutches are known which include pivotally interconnected ring components arranged in a circumferential sequence and usable for any clutch diameter. Such arrangements are disclosed in U.S. Pat. No. 3,702,649 (FIGS. 9 through 14) and U.S. Pat. No. 3,543,894. It is a disadvantage of these structures, however, that the individual retainer ring components, because of their snap-in connection, are not sufficiently stable as regards circumferentially generated forces. In case of impact-like torque surges, for example, at moments of clutch engagement from a free-wheeling state, because of the non-uniform arrangement of the individual sprags, significant circumferential forces are generated whereby the retainer ring components may become disengaged from their snapped-in state. As a result, the sprags will be no longer guided in the circumferential direction, and they may thus slide off their pressing spring and become inoperative. While this disadvantage may be eliminated by sprags which have laterally extending support pins held in the annular discs of the retainer ring, such an arrangement involves substantial expenses as discussed above.

SUMMARY OF THE INVENTION

It is an object of the invention to provide an improved retainer ring of the above-outlined type in which the sprags need no lateral support pins and further, which may be more economically manufactured than prior art structures and further wherein the need for a separate die casting tool for each ring diameter is also eliminated.

This object and others to become apparent as the specification progresses, are accomplished by the invention, according to which, briefly stated, each retainer ring link constitutes a clip which loosely surrounds the associated sprag at least at one end face and two sides thereof and further, at least one axial end of each clip is connectable with the adjacent annular disc.

In a retainer ring according to the invention as outlined above, only the annular discs have to be adapted to the diameter of the freewheel clutch. Such an adaptation, however, does not involve major expenses since the annular discs are inexpensive, punched-out sheet metal components. The retainer ring clips which surround the sprags in a cradle-like manner and hold the sprags captive both against circumferential and radial displacements relative to the retainer ring, remain of the same dimension and may therefore find application in retainer rings of any desired diameter. The holes in the annular discs for mounting the clips may be provided with methods known in rotor die punch operations. Thus, the punching operations on the annular discs may be performed with the same tool for all diameters. In such an operation, the annular discs are mounted in the tool by passing the tool chuck through the central opening of the annular disc. The chuck is rotated stepwise and after each incremental step a die, moved from above, punches openings which will serve as mounting holes for the clips. The distance between the stamping tool and the chuck as well as the number of steps for each revolution may be adjusted.

The invention is thus based on the recognition to use, instead of the completed retainer ring made in a die casting tool, two structural components, that is, punched-out and shaped (embossed) annular discs which may be manufactured inexpensively according to the desired diameter and clips which are to be mounted on the annular discs and which remain of the same dimensions for any clutch diameter.

Expediently, the clips have a U-shaped configuration as viewed from above in a radial direction as related to the retainer ring. Such a construction ensures a minimum amount of material for the clips. In case of particularly stringent requirements as to stability the clips may have the shape of a closed rectangular frame.

The connection of the clips with the annular discs is expediently effected by edgewise standing tabs formed on the clips. The tabs are inserted into the openings provided in the annular discs and bent down on the other side thereof. It will be understood that other types of securing means may be used, such as a rivet-like deformation of the tabs.

The clips may be made of any appropriate material; for reasons of stability it is advisable to make the clips as well as the annular discs of stamped-out sheet metal members.

In order to ensure that the sprags are securely held captive in the retainer ring, each clip has a wall which surrounds the sprag along a part of its circumference and which is arcuate in the radial direction, conforming to the arcuate pivotal movement of the sprags during engagement and disengagement of the freewheel clutch.

The annular discs are selectively connectable by means of friction with either the inner or the outer race of the freewheel clutch. One type of frictional engagement between the retainer ring and the inner or outer race is illustrated in a brochure entitled "Katalog 81 Freilauf-Einbauelemente", page 24, figure 47. In this disclosure, to the inner race (constituted by a solid shaft) there is frictionally secured a flat ring which, in turn, frictionally engages the retainer ring. The sprags may be so structured that they lift off the inner race or the outer race under the effect of the centrifugal forces generated during orbiting.

According to a particularly advantageous further feature of the invention, one of the annular discs is omitted and the clips are fastened only to the other annular disc and further, the clip portion which surrounds an end face of the sprag is remote from the annular disc which supports the clip. In this manner, only a single annular disc is needed and the axial guidance of the sprags at the other end is effected by the clip part surrounding the end face of the sprag.

BRIEF DESCRIPTION OF THE DRAWINGS

FIG. 2b is a side elevational view of the component shown in FIG. 2a.

FIG. 2c is an end elevational view taken in the direction of arrow IIIc of FIG. 2a.

FIG. 3b is a sectional view taken along line IIIb—IIIb of FIG. 3a.

FIG. 3c is an end elevational view taken in the direction of arrow IIIc of FIG. 3a.

FIG. 4a is a top plan view of a component of still another preferred embodiment of the invention.

FIG. 4b is a sectional view taken along line IVb—IVb of FIG. 4a.

FIG. 4c is an end elevational view taken in the direction of the arrow IVc of FIG. 4a.

FIG. 5a is a schematic elevational view, partially in section, of the invention in one mode of installation.

FIG. 5b is a schematic elevational view, partially in section, of the invention in another mode of installation.

DESCRIPTION OF THE PREFERRED EMBODIMENTS

Figure 1:
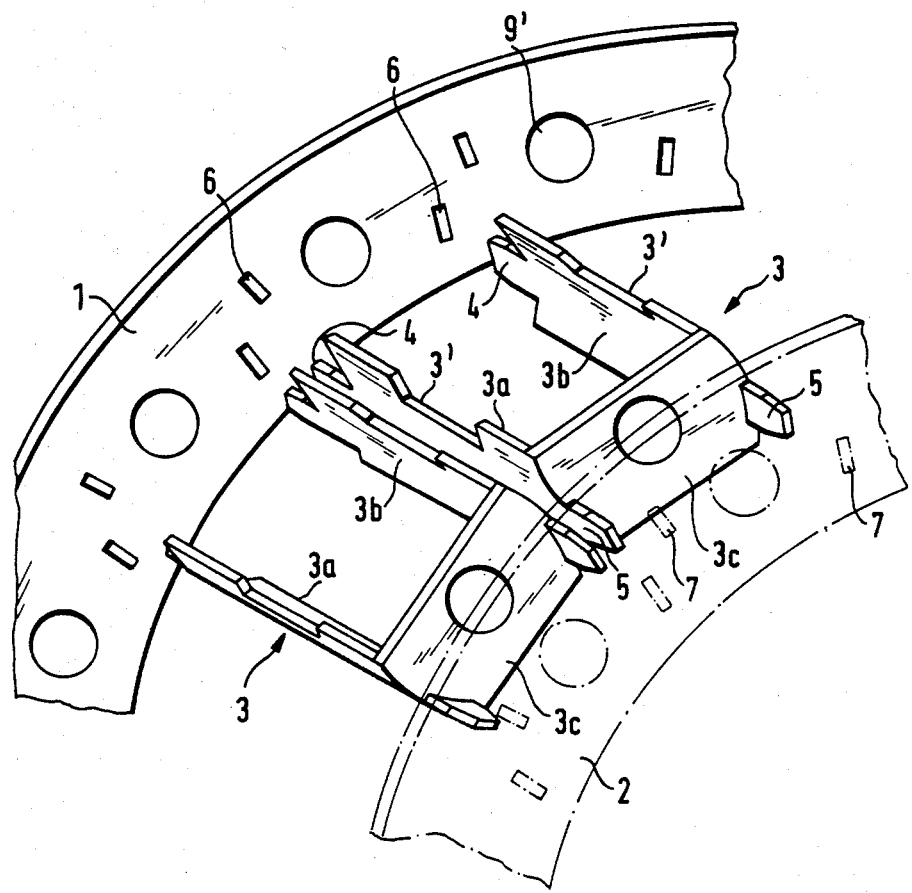
FIG. 1 is a perspective, radially exploded view of a preferred embodiment of the invention.

Turning now to FIG. 1, there is fragmentarily shown two annular discs 1 and 2 which are in an axially spaced parallel orientation with one another and whose plane extends substantially radially. The inner and outer diameters of each annular disc are determined by the dimensions of the freewheel clutch in which the retainer ring finds application. Expediently, the annular discs are stamped sheet metal components. At the inner or outer circumference the annular discs 1 and 2 may be provided with an angled flange for reinforcing purposes.

The two annular discs 1 and 2 are connected with one another by means of a plurality of clips 3 which are arranged in a circumferential series and each of which extends parallel to the axis of the retainer ring. As viewed radially from above (in relation to the retainer ring), each clip 3 has a generally U-shaped configuration formed of two, generally parallel legs 3a, 3b and a web 3c interconnecting the legs 3a, 3b. At least one leg 3a or 3b has a cross-sectionally curved inner face to hold a clamping member (sprag) captive and to guide the sprag in the circumferential and radial directions without obstructing a pivotal motion of the sprag which is required for the engagement and disengagement of the freewheel clutch.

Each clip 3 is connected with the two annular discs 1 and 2 by means of punched-out tabs 4 and 5 which project through corresponding openings 6 and 7 provided in the annular discs and are, on the other side of the discs, bent away from the opening. Since each clip holds a sprag captive, the sprag is placed in position between the legs 3a, 3b of the clip 3 prior to connecting the free end of the legs 3a, 3b to the annular disc 1.

It is noted that it is within the scope of the invention to dispense with the annular disc 2 altogether and thus close off the clips 3 only at their open side by the annular disc 1. In such a case, it may be of advantage to provide additional tabs 4 at the free end of the clip legs 3a, 3b or to utilize clips which, instead of a U-shape, have a closed-frame configuration. These measures reinforce the securement of the clips to the annular disc 1 and increase their own stability.

Openings 6 and 7 in the annular discs may be provided in the two annular discs 1 and 2 with one and the same tool independently from the disc diameter. This means that to the various retainer ring sizes only the annular discs have to be adapted in size. The annular discs, because of their simple and inexpensive manufacture as stamped-out sheet metal components are very economical. At the same time, as far as the clips are concerned, their dimensions remain the same for any clutch diameter.

Furthermore, there is ensured a great degree of freedom as concerns the density of the sprags (number of sprags per unit length in the circumferential direction) in the retainer ring. Dependent upon the magnitude of the torque to be transmitted, the annular discs are provided with more or less clips 3, together with the associated sprags.

At the radially outer edge of each clip leg 3a, 3b a cutout 3' is provided for receiving and guiding a support ring (not shown) usually needed in case the sprags are so constructed that they lift off the outer race of the clutch under the effect of centrifugal forces.

Figure 2B:
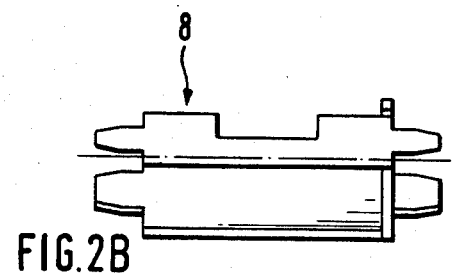
Figure 2C:
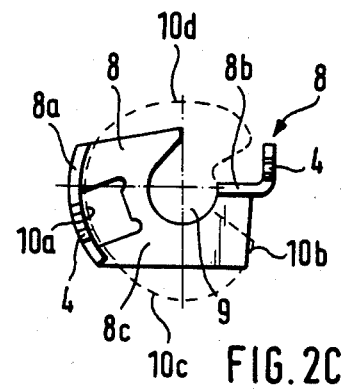
Figure 2A:
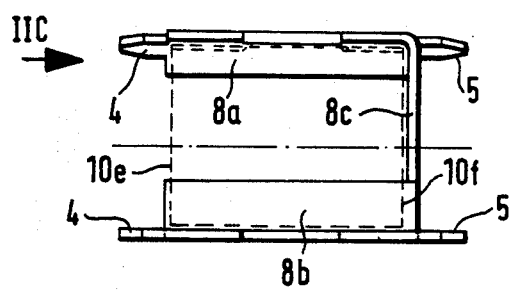
FIG. 2a is a top plan view of a component of another preferred embodiment.

Turning now to FIGS. 2a, 2b and 2c, there is shown a clip 8 according to another preferred embodiment of the invention. The clip 8 is, as regards its guide faces which surround the sprag, structured differently from the clips 3 shown in FIG. 1. The clip 8 has legs 8a and 8b and an interconnecting web 8c. The inner face of the clip leg 8a extending over one side of the associated sprag has a configuration similar to the clip leg 3a (FIG. 1). The opposite leg 8b, however, is of narrow configuration and extends approximately at the height level of the central axis of the sprag. By appropriate forming of the sprag it is ensured that it is held captive after the clip 8 is connected at its open end with the annular disc.

The cutout 9 provided in the web 8c serves for receiving a pressing spring for biasing the sprag. The pressing spring is placed in a known manner between the sprag and the clip 8 or one of the annular discs. The sprag 10 shown in FIGS. 2a and 2c in broken lines has a profile which, in principle, is conventional by itself. The sprag 10 has convex surfaces 10a and 10b and therebetween there are disposed clamping areas 10c and 10d which cooperate with respective inner and outer races (not shown) of the clutch. The axial ends of the sprags 10 are formed by flat end faces 10e and 10f.

Figure 3B:
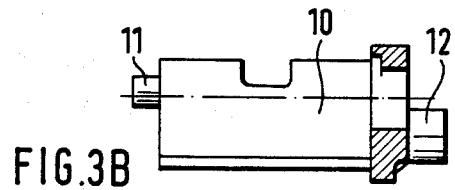
Figure 3C:
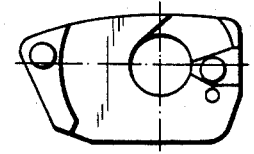
Figure 3A:
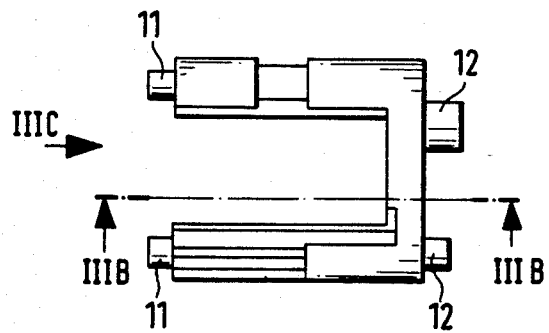
FIG. 3a is a top plan view of a component of another preferred embodiment of the invention.

It is within the scope of the invention to make the clips by metal die casting, plastic injection molding or by a "lost wax" procedure to obtain sintered components. A clip made of either one of these possible methods is illustrated in different views in FIGS. 3a, 3b and 3c. The edgewise standing tabs for connecting the clip with the two annular discs are formed as small cylindrical pins 11 and 12. These cylinders are expediently directly secured to the two annular discs. As an alternative, they may be inserted in a sliding seat in appropriate openings in the annular discs if an axial connection between the two annular discs is otherwise secured.

Another embodiment for the sprag-carrying clip according to the invention is shown in FIGS. 4a, 4b and 4c. As seen in FIG. 4a, the clip has a closed rectangular frame-shaped configuration. The sprags 10 are inserted radially under a certain angle and are thereafter turned into the captive, operative position, as known by itself.

Turning now to FIGS. 5a and 5b, there is illustrated the retainer ring formed of the annular disc 1 on which there is mounted a clip 3' holding captive a sprag 10', in an installed state between an inner race 14 and an outer race 15 of a freewheeling clutch. In FIG. 5a the outer race 15 is in frictional engagement with the annular disc 1 so that these two components will rotate as a unit, also during freewheeling. FIG. 5b differs from FIG. 5a in that the annular disc 1 is in a frictional engagement with the inner race 14 so that the annular disc 1 and the inner race 15 will rotate as a unit during freewheeling.

It will be understood that the above description of the present invention is susceptible to various modifications, changes and adaptations and the same are intended to be comprehended within the meaning and range of equivalents of the appended claims.

What is claimed is:

1. A retainer ring for a freewheel clutch, comprising:
(a) an annular disc having an axis and two opposite faces perpendicular to said axis; and
(b) a plurality of separate, mutually independent sprag-guiding clips mounted on one of said faces of said annular disc in a circumferential distribution about said axis; each clip extending parallel to said axis and defining a cage for holding captive by itself, at least in a radial direction, a sprag having a circumferential surface and opposite end faces; each clip comprising
 (1) two parallel, circumferentially spaced legs extending from said one face and being parallel to said axis; said legs bounding said cage and extending along opposite sides of the circumferential surface of the sprag; and
 (2) a web interconnecting said two legs at ends thereof remote from said one face of said annular disc; said web bounding said cage and extending along one of the end faces of the respective sprag.

2. A retainer ring as defined in claim 1, wherein said clips have a U-shaped configuration as viewed radially with respect to said axis.

3. A retainer ring as defined in claim 1, wherein said web is a first web; further comprising a second web interconnecting said legs at ends thereof remote from said first web, whereby said clips have a configuration of a rectangular frame as viewed radially with respect to said axis.

4. A retainer ring as defined in claim 1, further comprising securing tabs forming part of and projecting edgewise from said legs and mounting openings provided in said one face of said annular disc; each said tab passing through a mounting opening aligned with the respective tab.

5. A retainer ring as defined in claim 1, wherein said annular disc and said clips are made from stamped-out sheet metal.

6. A retainer ring as defined in claim 1, wherein at least one of said legs has an inner face having a radially oriented curvature conforming to an arcuate pivotal motion of the sprag during clutch-engagement and clutch-disengagement operation thereof.

7. A retainer ring as defined in claim 1, wherein said freewheel clutch has an inner race; said annular disc being frictionally connected with said inner race.

8. A retainer ring as defined in claim 1, wherein said freewheel clutch has an outer race; said annular disc being frictionally connected with said outer race.

9. A retainer ring as defined in claim 1, wherein said annnular disc is a first annular disc; further comprising a second annular disc disposed coaxially with said first annular disc; said second annular disc having a face oriented towards said one face of said first annular disc; said clips being mounted on said face of said second annular disc adjacent the web of each said clip; said clips connecting said first and second annular discs to one another.

10. A retainer ring as defined in claim 1, wherein said web of each clip has an aperture for accommodating a sprag pressing spring.

11. A retainer ring as defined in claim 1, wherein said one face of said annular disc has, between said legs of each clip, an aperture for accommodating a sprag pressing spring.

* * * * *